United States Patent [19]
Takeda et al.

[11] Patent Number: 5,653,515
[45] Date of Patent: Aug. 5, 1997

[54] BRAKE CONTROL SYSTEM THAT WARNS A VEHICLE DRIVER RESPONSIVE TO EXCESSIVE BRAKING FORCES ARE BEING APPLIED TO A BRAKE PEDAL

[75] Inventors: Kenji Takeda; Mitsuo Inagaki, both of Okazaki; Toshihisa Ishihara; Kazuyuki Yamashita, both of Aichi-ken; Shuichi Kohno, Okazaki, all of Japan

[73] Assignee: Nippon Soken, Inc., Aichi-ken, Japan

[21] Appl. No.: 523,430

[22] Filed: Sep. 5, 1995

[30] Foreign Application Priority Data

Sep. 5, 1994 [JP] Japan .................................. 6-211265
Oct. 17, 1994 [JP] Japan .................................. 6-278273

[51] Int. Cl.$^6$ ............................................. B60T 13/00
[52] U.S. Cl. ................................ 303/138; 303/113.4
[58] Field of Search ............................ 303/114.3, 113.4, 303/138; 188/1.11 R, 1.11 E

[56] References Cited

U.S. PATENT DOCUMENTS

| | | | |
|---|---|---|---|
| 3,622,977 | 11/1971 | Wakamatsu et al. | 303/138 |
| 4,070,562 | 1/1978 | Kuno et al. | 303/138 |
| 5,139,115 | 8/1992 | Browne et al. | 303/138 |
| 5,199,770 | 4/1993 | Yoshino et al. | 303/113.4 |
| 5,215,358 | 6/1993 | Beilfuss et al. | 303/114.3 |

*Primary Examiner*—Matthew C. Graham
*Attorney, Agent, or Firm*—Cushman Darby & Cushman, IP Group of Pillsbury Madison & Sutro LLP

[57] ABSTRACT

An improved control system for antilock brake control for an automotive vehicle which includes an excessive brake pedal-depressed force alarm unit. The control system determines a slip ratio and a slip ratio variation of a wheel to derive slippage conditions of the wheel, and provides an alarm to a driver when a brake pedal-depressed force exerted on a brake pedal is too great, causing wheel slippage to occur, especially during traveling on a slippery road surface such as a snowy road.

21 Claims, 12 Drawing Sheets

FIG. 3

TABLE 1

| VALVES 4A, 4B $\phantom{x}$ Smax $\phantom{x}$ *S | (1) Smax > SA | (2) SA ≧ Smax > SB | (3) SB ≧ Smax > SC | (4) SC ≧ Smax |
|---|---|---|---|---|
| (5) *S > DSA | ON | ON | ON | ON |
| (6) DSA ≧ *S > DSB | ON | ON | ON | ON→ON OFF→OFF |
| (7) DSB ≧ *S > DSC | ON | ON | ON | OFF |
| (8) DSC ≧ *S > DSD | ON | ON | ON→ON OFF→OFF | OFF |
| (9) DSD ≧ *S | ON | ON | OFF | OFF |

FIG. 4

TABLE 2

EXCESSIVE BRAKE ACTUATING FORE ALARM

| *S \ Smax | (1) Smax > $S_A$ | (2) $S_A \geq$ Smax > $S_B$ | (3) $S_B \geq$ Smax > $S_C$ | (4) $S_C \geq$ Smax |
|---|---|---|---|---|
| (5) *S > $DS_A$ | ON | ON | ON | OFF |
| (6) $DS_A \geq$ *S > $DS_B$ | ON | ON | ON | OFF |
| (7) $DS_B \geq$ *S > $DS_C$ | ON | ON | OFF | OFF |
| (8) $DS_C \geq$ *S > $DS_D$ | ON | OFF | OFF | OFF |
| (9) $DS_D \geq$ *S | ON | OFF | OFF | OFF |

FIG. 5

TABLE 3

| PROPER BRAKE ACTUATING FORCE ALARM | | (1) $S_{max} > S_A$ | (2) $S_A \geq S_{max} > S_B$ | (3) $S_B \geq S_{max} > S_C$ | (4) $S_C \geq S_{max}$ |
|---|---|---|---|---|---|
| *S | $S_{max}$ | | | | |
| (5) $*S > DS_A$ | | OFF | OFF | OFF | ON |
| (6) $DS_A \geq *S > DS_B$ | | OFF | OFF | OFF | ON |
| (7) $DS_B \geq *S > DS_C$ | | OFF | OFF | ON | ON* |
| (8) $DS_C \geq *S > DS_D$ | | OFF | ON | ON | ON |
| (9) $DS_D \geq *S$ | | OFF | ON | ON | ON |

TABLE 4

| EXCESSIVE BRAKE ACTUATING FORE ALARM | | | | | |
|---|---|---|---|---|---|
| *S \ Smax | (1) $S_{max} > S_A$ | (2) $S_A \geq S_{max} > S_B$ | (3) $S_B \geq S_{max} > S_C$ | (4) $S_C \geq S_{max}$ |
| (5) $*S > DS_A$ | ON | ON | ON | ON |
| (6) $DS_A \geq *S > DS_B$ | ON | ON | ON | OFF |
| (7) $DS_B \geq *S > DS_C$ | ON | ON | OFF | OFF |
| (8) $DS_C \geq *S > DS_D$ | ON | OFF | OFF | OFF |
| (9) $DS_D \geq *S$ | ON | OFF | OFF | OFF |

FIG. 12

TABLE 5

| PROPER BRAKE ACTUATING FORCE ALARM *S \ Smax | (1) Smax > SA | (2) $S_A \geqq S_{max} > S_B$ | (3) $S_B \geqq S_{max} > S_C$ | (4) $S_C \geqq S_{max}$ |
|---|---|---|---|---|
| (5) *S > DSA | OFF | OFF | OFF | OFF |
| (6) $DS_A \geqq *S > DS_B$ | OFF | OFF | OFF | ON |
| (7) $DS_B \geqq *S > DS_C$ | OFF | OFF | ON | ON* |
| (8) $DS_C \geqq *S > DS_D$ | OFF | ON | ON | ON |
| (9) $DS_D \geqq *S$ | OFF | ON | ON | ON |

FIG. 13

BRAKE CONTROL SYSTEM THAT WARNS A VEHICLE DRIVER RESPONSIVE TO EXCESSIVE BRAKING FORCES ARE BEING APPLIED TO A BRAKE PEDAL

BACKGROUND OF THE INVENTION

1. Technical Field

The present invention relates generally to an improved structure of a brake system for an automotive vehicle which is designed to inform a vehicle operator of braking conditions when the vehicle travels on a slippery road surface such as a snowy road which easily induces wheel slippage. More particularly, the invention is directed to such a brake system which is used with an antilock brake system (ABS).

2. Background Art

In recent yeas, ABS control is in widespread use for maintaining slip ratios of wheels within a proper range for ensuring effective braking and stability of a vehicle body. A conventional ABS blocks a hydraulic source circuit operated by a brake pedal to provide braking control through a computer hydraulic brake pressure supplied from another hydraulic source to wheel cylinders. The structure of the ABS control unit is relatively complex and expensive.

Figure 14:
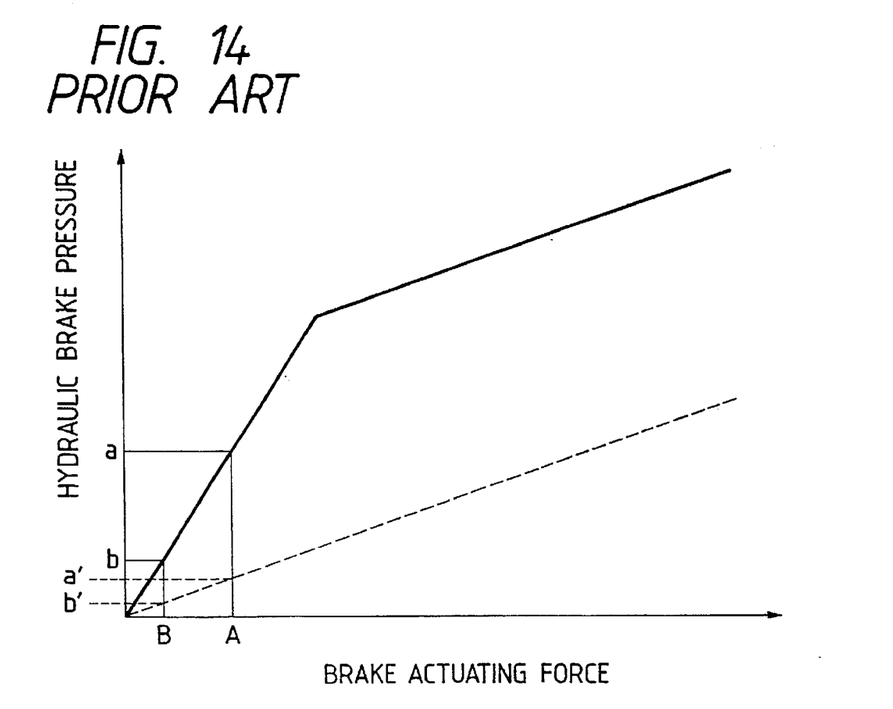
FIG. 14 is a graph which shows the relation between a hydraulic brake pressure and a brake actuating force in a conventional antilock brake control system.

U.S. Pat. No. 5,215,358, filed on Aug. 29, 1991, teaches an ABS control which switches the pressure in a pressure chamber of a booster of a brake unit between atmospheric pressure and vacuum. FIG. 14 shows the relation between brake pedal-depressing force and hydraulic brake pressure. In the drawing, a solid line indicates that a brake assist force is produced when the pressure chamber of the booster is exposed to the vacuum, while a broken line indicates that no brake assist force is produced when the pressure chamber is exposed to the atmospheric pressure. Therefore, even when the brake pedal-depressing force exerted by a driver is maintained constant between A and B levels, the ABS control is accomplished effectively by changing a supply pressure level to the pressure chamber of the booster cyclically within a range from a'–a to b'–b.

The above conventional ABS however encounters the following drawback. For example, when the brake pedal-depressing force is at the level A, the hydraulic brake pressure of at least level a is produced even though the brake assist pressure is not produced. This level of hydraulic brake pressure is too high to perform the ABS control especially when the vehicle is traveling on a low friction road surface such as a snowy road surface.

SUMMARY OF THE INVENTION

It is therefore a principal object of the present invention to avoid the disadvantages of the prior art.

It is another object of the invention to provide a brake control system for automotive vehicles which is designed to inform a vehicle operator of a proper brake actuating force (i.e., a brake pedal-depressing force) according to slippage conditions of road wheels.

It is a further object of the invention to provide an improved hydraulic brake pressure control system for an antilock brake system which is capable of producing a proper hydraulic brake pressure under ABS control even when a vehicle is traveling on a slippery road surface such as a snowy road surface.

According to one aspect of the present invention, there is provided a brake control system for an automotive vehicle which comprises a brake unit operable in a first control mode to apply a brake to a wheel under a brake force pedal-depressed force exerted by a vehicle operator on a brake pedal and a second control mode to amplify the brake force pedal-depressed force to apply a brake to the wheel under the amplified brake pedal-depressed force, a slippage condition determining means for determining a slippage condition of the wheel, a control means for controlling the brake unit in one of the first and second brake control modes selected based on the slippage condition determined by the slippage condition determining means, and a slippage condition informing means for informing the vehicle operator of the slippage condition determined by the slippage condition determining means to instruct vehicle operator to depress the brake pedal by a proper brake actuating force.

In the preferred mode of the invention, the slippage condition informing means provides a warning signal to the vehicle operator when the slippage condition of the wheel encounters a preselected wheel locked condition.

The slippage condition determining means determines a slip ratio of the wheel and a slip ratio variation per unit time. The slippage condition informing means provides the warning signal to the vehicle operator when a combination of the slip ratio and the slip ratio variation falls within a given range indicative of excess of the brake pedal-depressed force.

The slippage condition informing means provides the warning signal to the vehicle operator when one of first, second, and third conditions is encountered. In the first condition, the slip ratio is greater than a first slip ratio threshold value. In the second condition, the slip ratio is smaller than the first slip ratio threshold and greater than a second slip ratio threshold value and the slip ratio variation is greater than a first slip ratio variation threshold value indicating that the wheel is being brought into a locked condition. In the third condition, the slip ratio is smaller than the second slip ratio threshold and greater than a third slip ratio threshold value and the slip ratio variation is greater than a second slip ratio variation threshold value greater than the first slip ratio variation threshold value.

The slippage condition informing means provides vibrations to the vehicle operator through the brake pedal as the warning signal.

A proper brake pedal-depressed force informing means is further provided which informs the vehicle operator of a proper brake pedal-depressed force when the brake pedal-depressed force exerted on the brake pedal falls within a proper brake pedal-depressed force range.

The proper brake pedal-depressed force informing means provides a proper braking condition indicative signal to the vehicle operator when one of fourth, fifth, and sixth conditions is encountered. In the fourth condition, the slip ratio is smaller than the third slip ratio threshold value. In the fifth condition, the slip ratio is greater than the third slip ratio threshold value and smaller than the second slip ratio threshold value and the slip ratio variation is smaller than the first slip ratio variation threshold value. In the sixth condition, the slip ratio is greater than the second slip ratio threshold value and smaller than the first slip ratio threshold value and the slip ratio variation is smaller than the first slip ratio variation threshold value.

The proper brake pedal-depressed force informing means provides the proper braking condition indicative signal only for a preselected period of time after a given condition that the slip ratio is smaller than the third slip ratio threshold value and the slip ratio variation is greater than the third slip ratio variation threshold value and smaller than a fourth slip ratio variation threshold value greater than the second slip ratio variation value, is met.

According to another aspect of the present invention, there is provided a brake control system for an automotive vehicle which comprises a brake unit responsive to a brake pedal-depressed force exerted by a vehicle operator on a brake pedal for applying a brake to a wheel, a slippage condition determining means for determining a slippage condition of the wheel, and a slippage condition informing means for informing the vehicle operator of the slippage condition determined by the slippage condition determining means to instruct the vehicle operator to depress the brake pedal by a proper brake actuating force.

This invention may also be used with the various arrangements, as mentioned in the preferred mode of the above first invention.

BRIEF DESCRIPTION OF THE DRAWINGS

The present invention will be understood more fully from the detailed description given hereinbelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
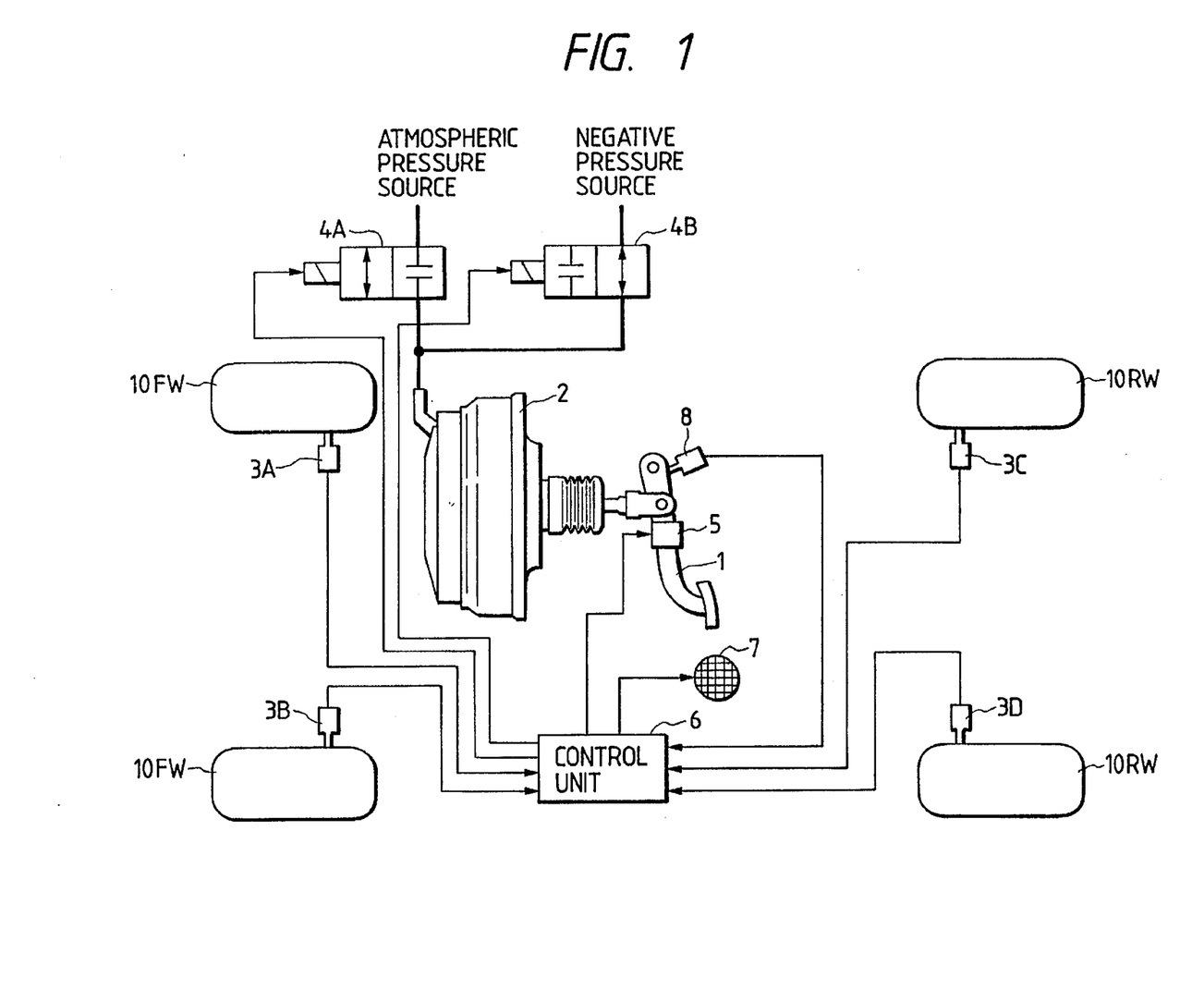
FIG. 1 is a block diagram which shows a brake control system according to the present invention.

Referring now to the drawings, particularly to FIG. 1, there is shown an automotive brake control system according to the first embodiment of the present invention which is used with an antilock brake system (ABS). Note that the present invention is not limited to a brake control system with the ABS, but may alternatively be applied to a conventional brake system without the ABS, which will be discussed later as the second embodiment.

A brake booster 2 having a known structure is connected to a brake pedal 1. The booster 2 amplifies brake pedal-depressed force (i.e., brake actuating force) exerted by a vehicle operator on the brake pedal 1 to activate a master cylinder (not shown) so that hydraulic brake pressure is supplied to wheel cylinders (not shown) mounted on front and rear wheels 10FW and 10RW, respectively. These hydraulic circuit arrangements are well known in the art as an ABS, and explanation thereof in detail will be omitted here. For example, U.S. Pat. No. 5,215,358, as already discussed in the introductory part of this specification, discloses a hydraulic brake circuit for ABS control, disclosure of which is incorporated herein by reference.

The booster 2 has a pressure chamber which is selectively exposed to atmospheric pressure through a normally-closed directional control valve 4A and to negative pressure produced by a negative pressure source through a normally-open directional control valve 4B to select between a brake assist mode and a non-brake assist mode. Specifically, when the directional control valves 4A and 4B are both turned off, the pressure chamber of the booster 2 communicates with the negative pressure source so that the booster 2 is turned on to establish the brake assist mode. Alternatively, when the directional control valves 4A and 4B are both turned on, the pressure chamber of the booster 2 is exposed to the atmospheric pressure so that the booster 2 is turned off to establish the non-brake assist mode. Note that the negative pressure source may be provided with an intake manifold in the case of a gasoline engine or alternatively a vacuum pump in the case of a diesel engine.

Electromagnetic pick-up type wheel speed sensors 3A to 3D are mounted on the wheels 10FW and 10RW, respectively, which provide voltage outputs in the form of a sine wave according to speeds of the wheels. A brake switch 8, an excessive brake actuating force alarm 5, and a proper brake actuating force alarm 7 are secured on the brake pedal 1. The brake switch 8 is responsive to pivotal movement of the brake pedal 1 to provide a signal indicative of whether the braking operation has been performed by the vehicle operator or not to a control unit 6. The excessive brake actuating force alarm 5 is activated by the control unit 6. The proper brake actuating force alarm is formed with a buzzer and activated by the control unit 6.

Figure 2:
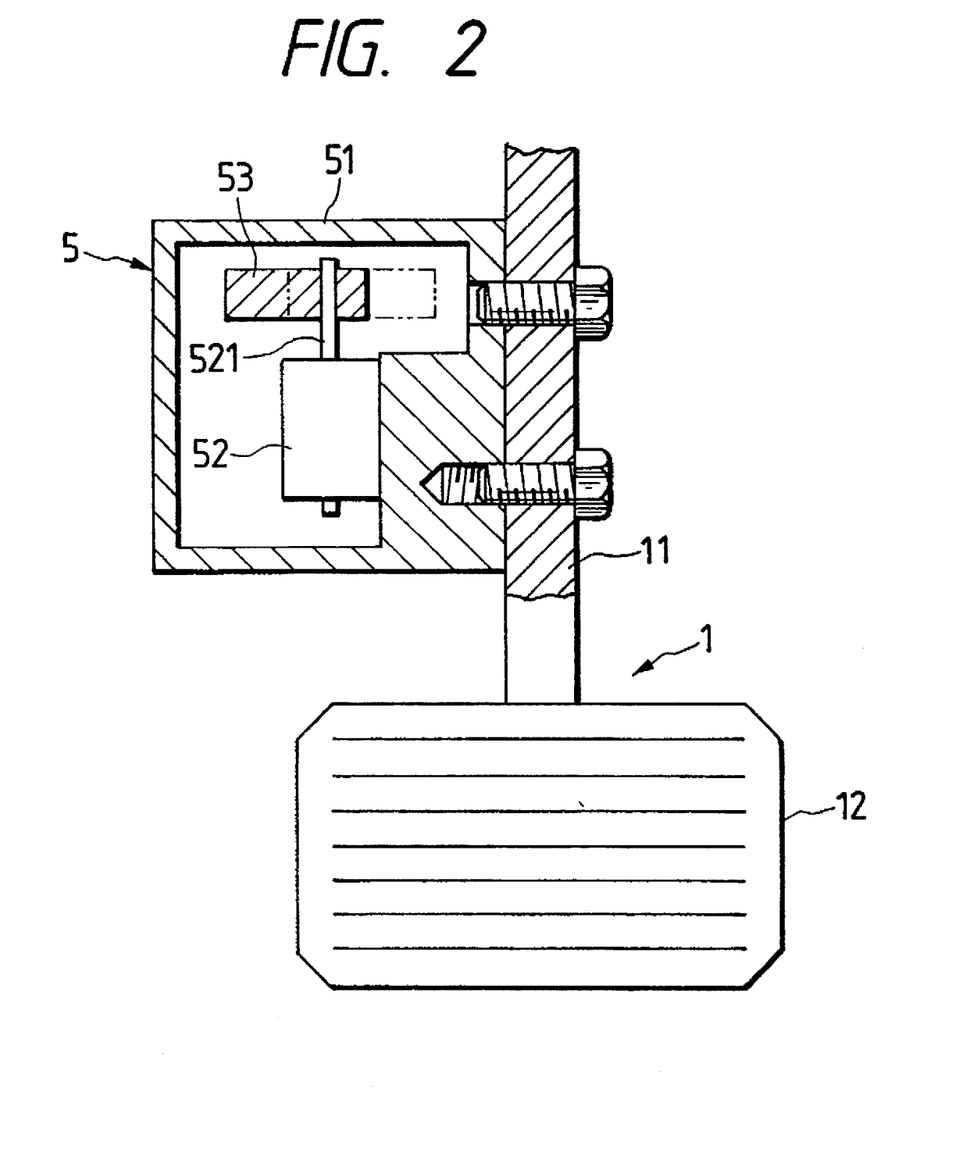
FIG. 2 is a partial cross-sectional view which shows a structure of an excessive brake actuating force alarm.

The excessive brake actuating force alarm 5, as shown in FIG. 2, includes a casing 51 and an electric motor 52. The casing 51 is bolted to a side wall 11 of an operating arm 11 of the brake pedal 1. The motor 52 is disposed within the casing 51, and has an output shaft 521 extending parallel to the operating arm 11 and supporting a disc 53 eccentrically. When the control unit 5 has determined in a manner, as described later in detail, that an excessive brake actuating force is being applied to the brake pedal 1, the motor 52 is activated to rotate the disc 53 so that vibrations are produced, and then transmitted through the operating arm 11 to a foot of the vehicle operator placed on a pedal pad 12. The vibrations of the disc 53 are oriented in a radial direction of the disc 53 which is parallel to the brake actuating force produced by the vehicle operator (i.e., pivotal movement of the brake pedal) so that the vehicle operator can sense the vibrations easily.

Figure 3:
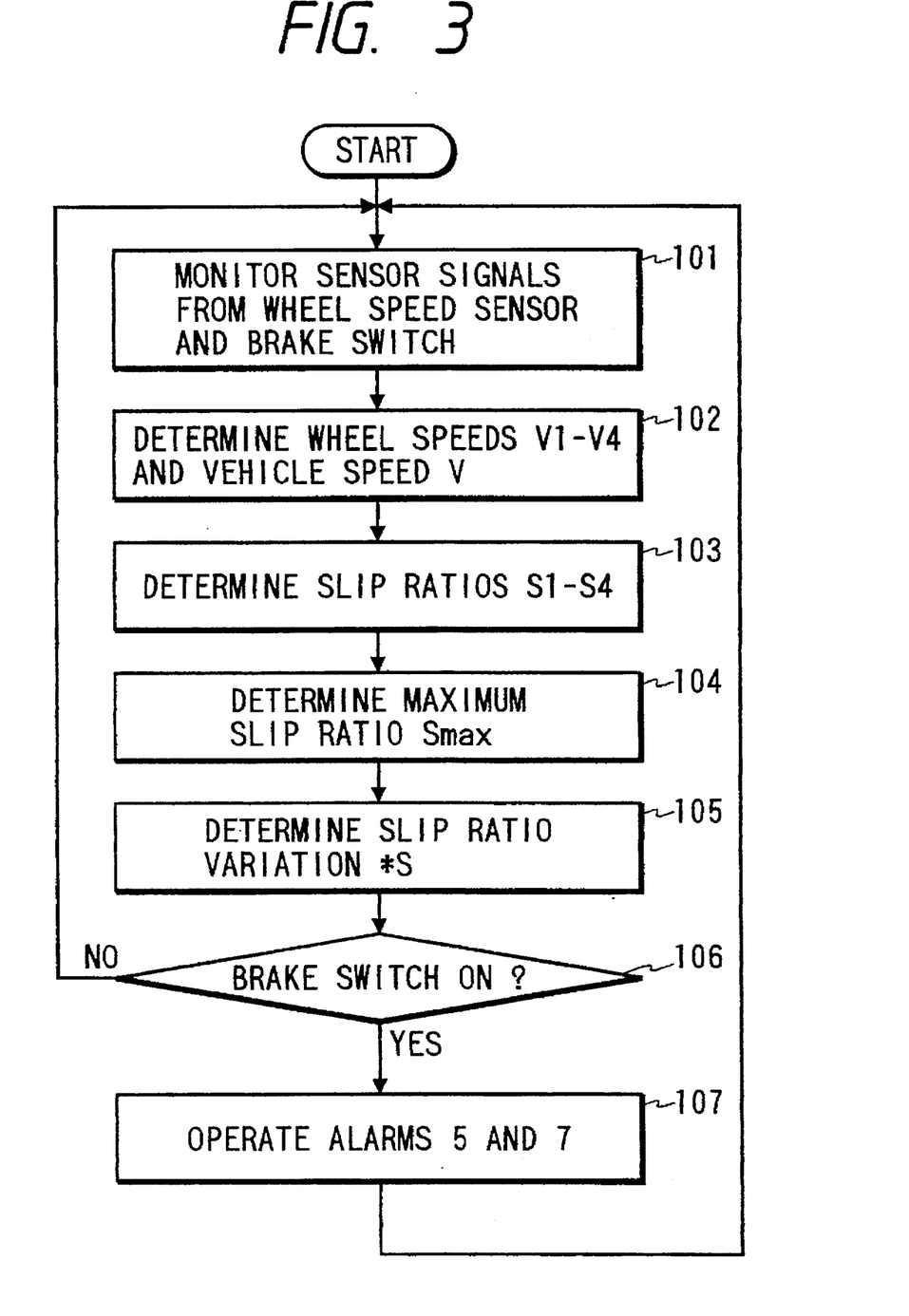
FIG. 3 is a flowchart of a program performed by a control unit of a brake control system.

FIG. 3 shows a flowchart of a program or sequence of logical steps performed by the control unit 5.

After entering the program, the routine proceeds to step 101 wherein sensor signals from the wheel speed sensors 3A to 3D and a switching signal from the brake switch 8 are monitored. The routine then proceeds to step 102 wherein wheel speeds V1 to V4 and a vehicle speed V (i.e., vehicle body speed) are determined. For example, the vehicle speed V may be determined based on the greatest one of the wheel speeds V1 to V4.

The routine then proceeds to step 103 wherein slip ratios S1 to S4 of the wheels 10FW and 10RW are determined according to the equation below.

$$Sn = (V - Vn)/V$$

where n=1, 2, 3, and 4.

The routine then proceeds to step 104 wherein a maximum slip ratio Smax is determined by selecting the greatest one from among the slip ratios S1 to S4. The routine then proceeds to step 105 wherein a variation in slip ratio *S per unit time is determined according to the following relation:

$$*S = dSmax/dt$$

The routine proceeds to step 106 wherein it is determined whether the brake switch 8 is turned on or off. If a NO answer is obtained meaning that the brake switch 8 is turned off, then the routine returns back to step 101. Alternatively, if a YES answer is obtained meaning that the brake switch 8 is turned on, that is, that the brake pedal 1 is depressed by the vehicle operator, then the routine proceeds to step 107 wherein the directional control valves 4A and 4B, the excessive brake actuating force alarm 5, and the proper brake actuating force alarm 7 are activated according to given maps, as will be described later in detail.

Figure 4:
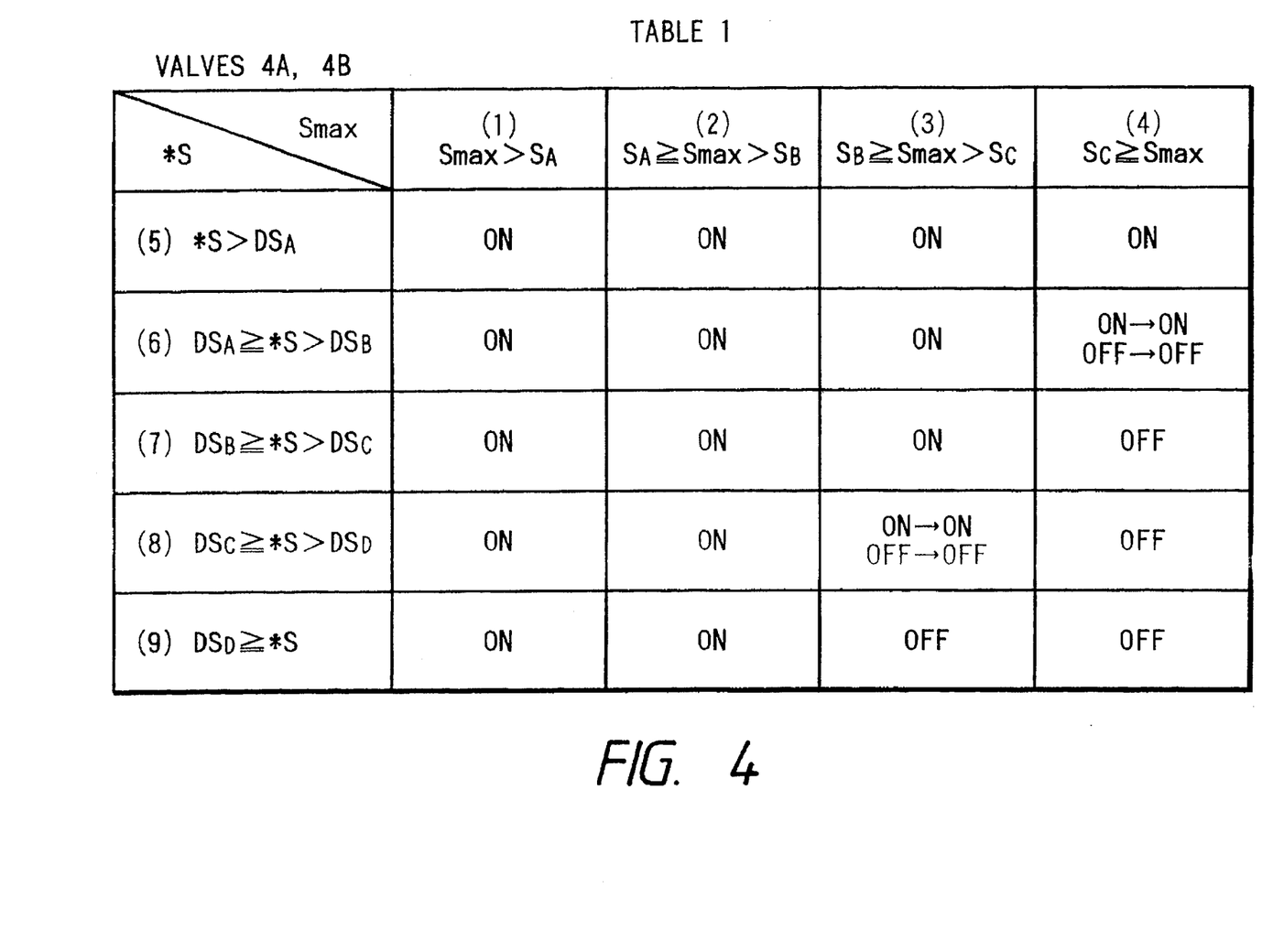
FIG. 4 is a table 1 which shows an on-off operation pattern for directional control valves 4A and 4B.
Figure 5:
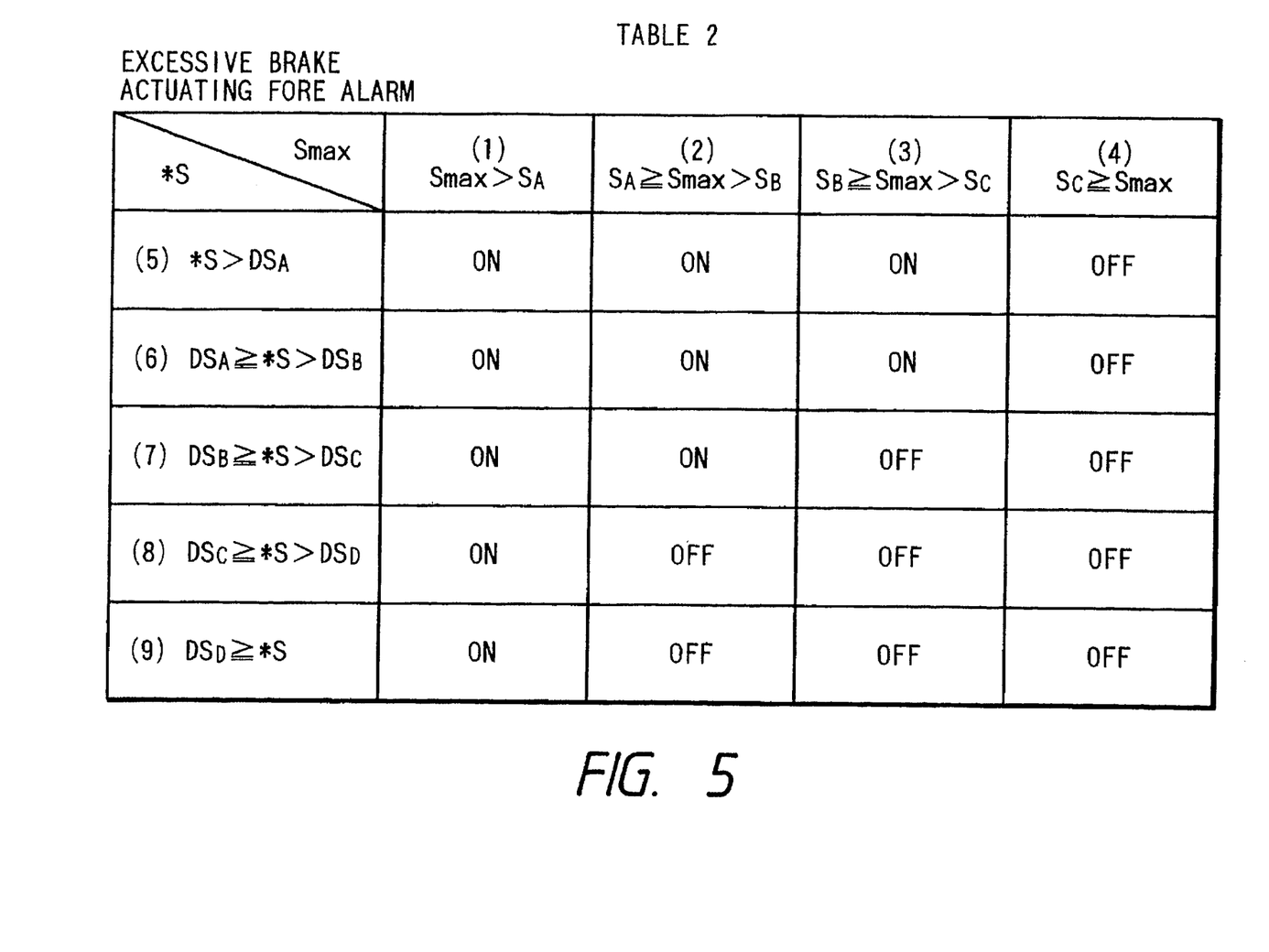
FIG. 5 is a table 2 which shows an on-off operation pattern for an excessive brake actuating force alarm.
Figure 6:
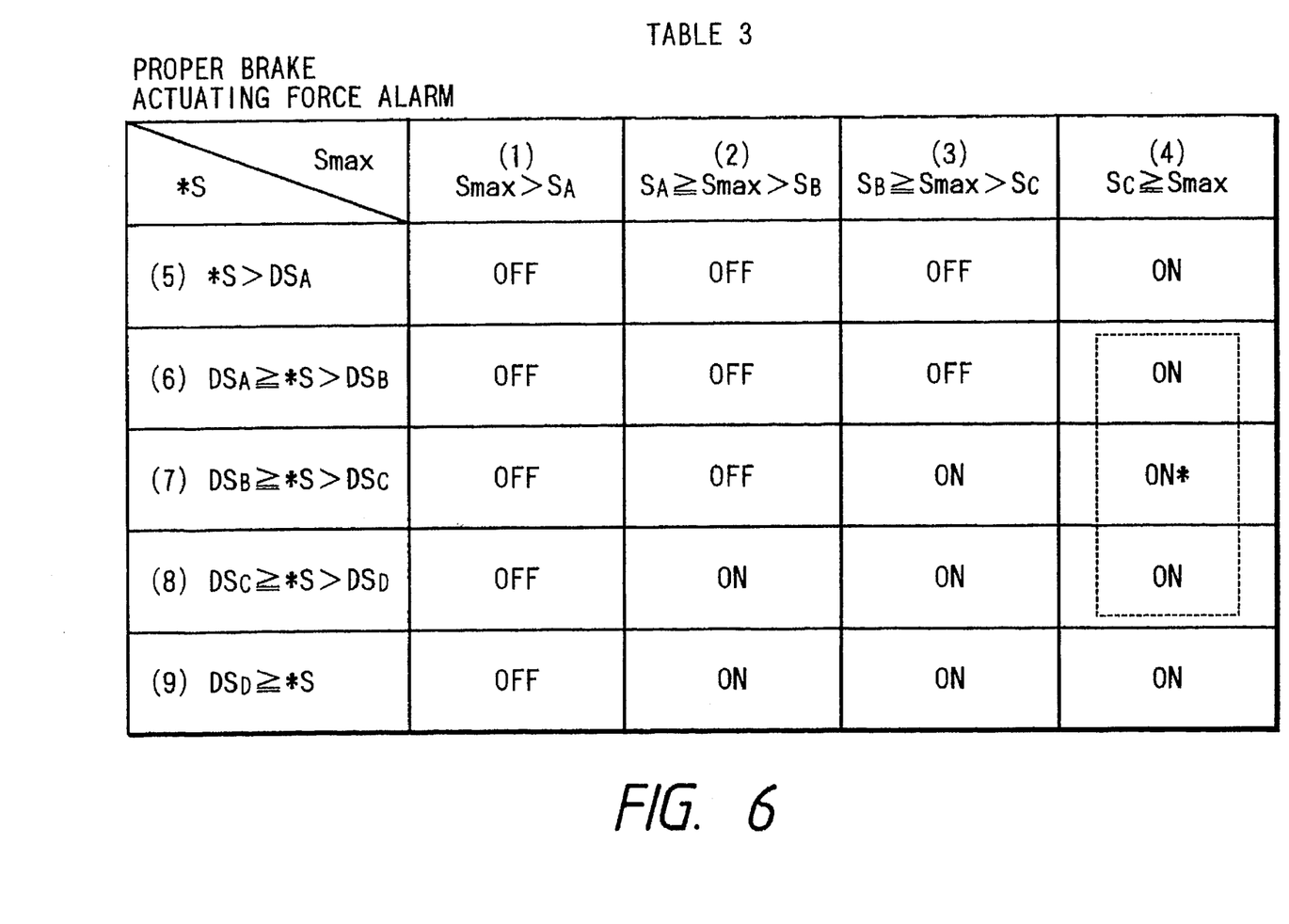
FIG. 6 is a table 3 which shows an on-off operation pattern for a proper brake actuating force alarm.

FIGS. 4, 5, and 6 are tables 1, 2, and 3 which show operation schedules or maps for the directional control valves 4A and 4B, the excessive brake actuating force alarm 5, and the proper brake actuating force alarm 7, respectively. As will be apparent from the tables, the directional control valves 4A and 4B, the excessive brake actuating force alarm 5, the proper brake actuating force alarm 7 are turned on and off according to the magnitudes of the maximum slip ratio Smax and the slip ratio variation *S.

As shown in the tables 1, 2, and 3, for the maximum slip ratio Smax, four ranges (1) to (4) are defined by three threshold values $S_A$, $S_B$, and $S_C$. In this embodiment, $S_A$=0.5, $S_B$=0.3, and $S_C$=0.15.

The range (1) represents that the wheels are skidding extremely at a first speed.

The range (2) represents that the wheels are skidding greatly at a second speed lower than the first speed.

The range (3) represents that the wheels are skidding slightly at a third speed lower than the second speed.

The range (4) represents that the wheels are hardly skidding.

For the slip ratio variation *S, five ranges (5) to (9) are defined by threshold values $DS_A$, $DS_B$, $DS_C$, and $DS_D$. In this embodiment, $DS_A$=0.7/sec., $DS_B$=0.35/sec., $DS_C$=−0.35/sec., and $DS_D$=−0.7/sec.

The range (5) represents that the wheels are being quickly brought into locked conditions.

The range (6) represents that the wheels are being slowly brought into locked conditions.

The range (7) represents that wheel speeds are hardly changed.

The range (8) represents that the locked wheels are being slowly brought into recovered conditions.

The range (9) represents that the locked wheels are being quickly brought into recovered conditions.

Referring to the table 1, when the maximum slip ratio Smax falls within the range (1) or (2), the directional control valves 4A and 4B are both turned on so that the atmospheric pressure is introduced into the booster 2 to establish the non-brake assist mode. When the brake pedal 1 is depressed by the vehicle operator under a proper brake actuating force, the maximum slip ratio Smax is relatively small so that it lies in the range (3) or (4). Thus, when the locked wheels are not recovered in the range (3) (i.e., when the slip ratio variation *S falls within the range (5), (6), or (7)), the directional control valves 4A and 4B are both turned on to turn off the booster 2. When the locked wheels are being recovered slowly in the range (3) (i.e., when the slip ratio variation *S falls within the range (8)), the directional control valves 4A and 4B are maintained in the same conditions as those one program cycle before, respectively. When the locked wheels are being recovered quickly (i.e., when the slip ratio variation *S falls within the range (9), the directional control valves 4A and 4B are both turned off for increase in brake hydraulic pressure.

Figure 7:
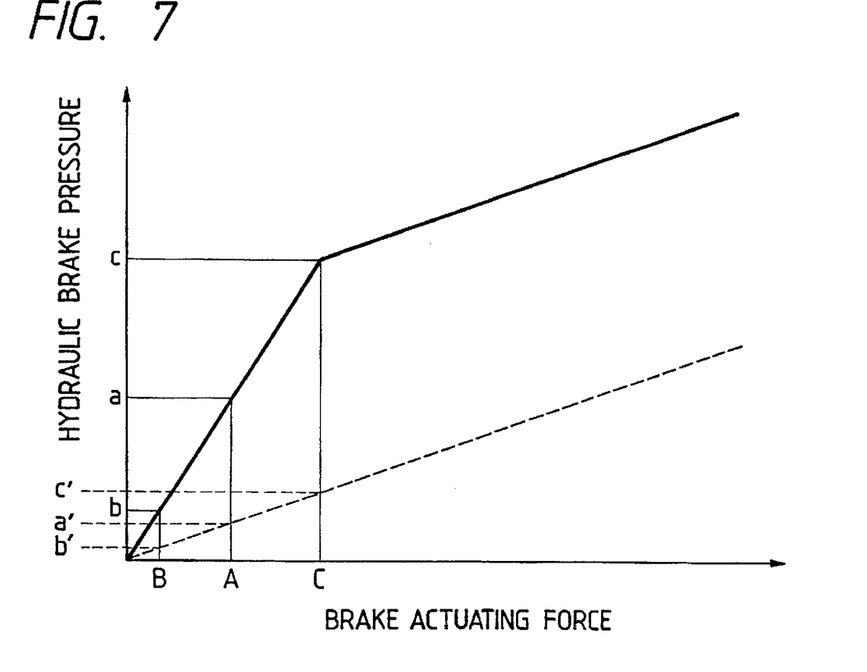
FIG. 7 is a graph which shows the relation between a hydraulic brake pressure and a brake actuating force.

In the range (4), when the wheels are not brought into the locked conditions (i.e., when the slip ratio variation *S falls within the range (7), (8), or (9)), the directional control valves 4A and 4B are turned off, while when the wheels are being slowly brought into the locked conditions (i.e., when the slip ratio variation *S falls within the range (6)), the directional control valves 4A and 4B are maintained in the same conditions as those one program cycle before, respectively. When the wheels are being quickly brought into the locked conditions (i.e., when the slip ratio variation *S falls within the range (5)), the directional control valves 4A and 4B are both turned on. With these on-off operations of the directional control valves 4A and 4B, when the brake actuating force (i.e., brake pedal-depressed force) is, as shown in FIG. 7, at A, B, or C level, the hydraulic brake pressure is increased and decreased within a range a–a', b–b', or c–c' for preventing the wheels from being locked.

When the brake pedal 1 is depressed under the brake actuating force C, the brake actuating force C may be too great to perform the ABS control so that the locked wheels cannot be recovered even if the directional control valves 4A and 4B are turned on and off to change the brake hydraulic pressure in the range c–c'. For avoiding this drawback, the brake control system of this invention activates the excessive brake actuating force alarm 5 according to an operation map shown in FIG. 5. When the maximum slip ratio Smax is extremely great, that is, it falls within the range (1), when the maximum slip ratio Smax falls within the range (2) and the locked wheels are not recovered (i.e., the range (5), (6), or (7)), or when the maximum slip ratio Smax is small, that is, it falls within the range (3), but the wheels are being brought into the locked conditions (i.e., the range (5) or (6)), the excessive brake actuating force alarm 5 is turned on to produce vibrations for urging the vehicle operator to return the brake pedal 1. This causes the brake actuating force to be decreased from the level C to the level A shown in FIG. 7, thereby allowing the ABS control to be performed by turning on and off the directional control valves 4A and 4B in the range a–a' which provides a lower brake hydraulic pressure for establishing an optimum slip ratio.

The excessive brake actuating force alarm 5 is, as can be seen from the above discussion, activated only when the brake actuating force is too great to perform the ABS control. Thus, if the vehicle operator decreases the brake actuating force to the level B more than required, it may cause the braking distance to be lengthened undesirably. In order to minimize the braking distance without having the wheels skid greatly, it is advisable that the directional control valves 4A and 4B be turned on and off cyclically to perform the ABS control. During the ABS control, the brake pedal 1 is returned slightly when the directional control valves 4A and 4B are both turned on, while it is depressed downward when the directional control valves 4A and 4B are turned off. It is therefore preferable that the vehicle operator continue to depress the brake pedal 1 by a brake actuating force of the degree to which the vehicle operator can feel such vibrations of the brake pedal 1 under the ABS control. It may however be difficult for beginning drivers to perceive these vibrations of the brake pedal 1.

For eliminating the above problem, the brake control system of the invention activates the proper brake actuating force alarm 7 according to an operation schedule or map shown in FIG. 6 which is substantially in contrast to that shown in FIG. 5. When the excessive brake actuating force alarm 5 is turned on, it causes the proper brake actuating force alarm 7 to be turned off, while when the former is turned off, it causes the latter to be turned on. Labeled "ON*" defined by the ranges (4) and (7) is an operation zone which appears inevitably when the vehicle brakes on a normal road surface such as an asphalt road surface, and in which it is not preferable that the proper brake actuating force alarm 7 continues to buzz and there is a problem in that the vehicle operator becomes moderate in depressing the brake pedal 1 so that the braking distance is increased. For overcoming this problem, the control unit 6 performs a program shown in a flowchart of FIG. 8 after entering step 107 in the flowchart of FIG. 3.

Figure 8:
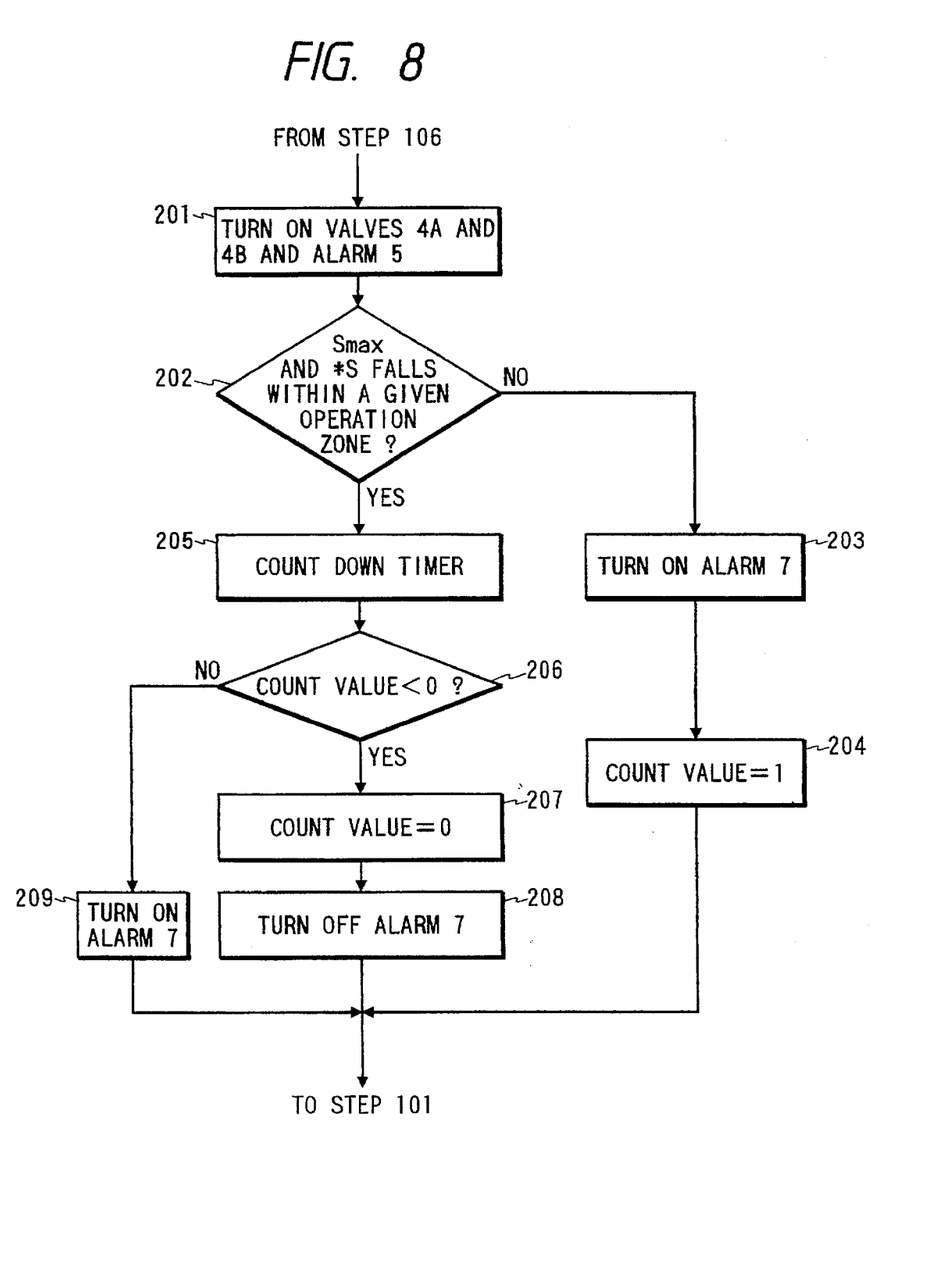
FIG. 8 is a flowchart which shows a program for controlling a proper brake actuating force alarm.

In step 201, the directional control valves 4A and 4B and the excessive brake actuating force alarm 5 are operated according to the maps shown in the tables 1 and 2. The routine then proceeds to step 202 wherein it is determined if a combination of the maximum slip ratio Smax and the slip ratio variation *S falls within any of operation zones defined by the ranges (4) and (6), (4) and (7), and (4) and (8). If a NO answer is obtained, then the routine proceeds to step 203 wherein the proper brake actuating force alarm 7 is activated according to the map shown in the table 3. The routine proceeds to step 204 wherein a timer is set to one (1).

Alternatively, if a YES answer is obtained in step 202, then the routine proceeds to step 205 wherein a count value of the timer is counted down. The routine then proceeds to step 206 wherein it is determined whether the count value of the timer is less than zero or not. If a NO answer is obtained meaning that the count value is greater than zero, then the routine proceeds to step 209 wherein the proper brake actuating force alarm 7 is turned on. If a YES answer is obtained in step 205, then the routine proceeds to step 207 wherein the timer is reset so that the count value is set to zero. The routine then proceeds to step 208 wherein the proper brake actuating force alarm 7 is turned off.

Therefore, the proper brake actuating force alarm 7 is turned on to buzz only for one second when the combination of the maximum slip ratio Smax and the slip ratio variation *S enters any of the operation zones defined by the ranges (4) and (6), (4) and (7), and (4) and (8) to inform the vehicle operator that the degree of the brake actuating force is a proper level. This prevents the braking distance from being increased undesirably, which may be caused when the vehicle operator cannot find a proper brake actuating force and depresses the brake pedal 1 moderately. The reason for providing the operation zones defined by the ranges (4) and (6) and the ranges (4) and (8) is to prevent the proper brake actuating force alarm 7 from being turned on uselessly since the slip ratio variation *S is usually varied a little as long as the vehicle moves.

Figure 9:
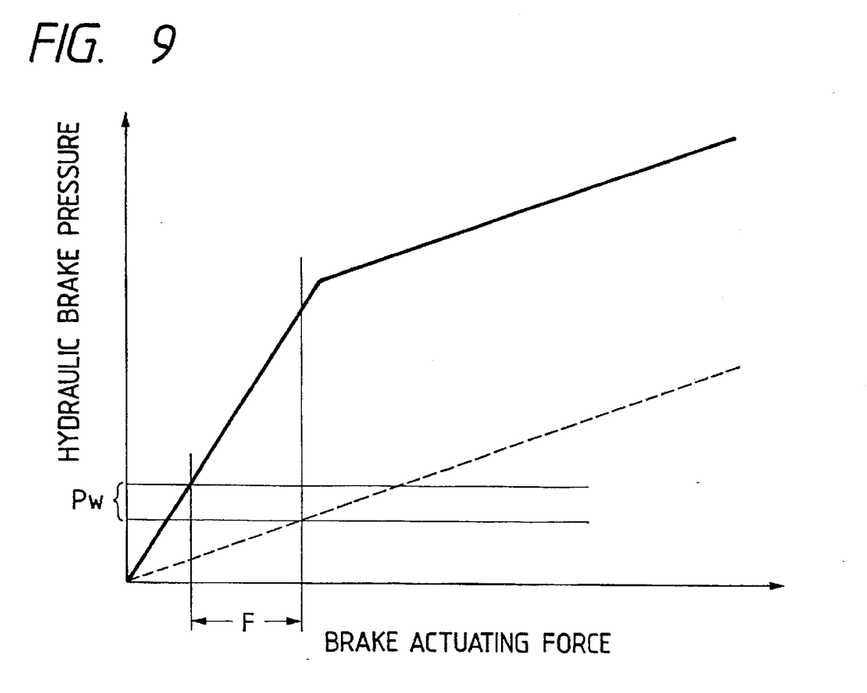
FIG. 9 is a graph which shows the relation between a hydraulic brake pressure and a brake actuating force.

Thus, even when the vehicle travels on a road surface having a lower friction coefficient such as a snowy road surface, an optimum brake actuating force is always maintained by depressing the brake pedal 1, returning it in response to the vibrations produced by the excessive brake actuating force alarm 5, and keeping a brake pedal-depressed force when the proper brake actuating force alarm 7 is turned on. Note that an optimum brake pedal-depressing force is not fixed, but may lie within a range F, as shown in FIG. 9, for providing an optimum hydraulic brake pressure Pw. When there is no pedal vibrations and buzzer sound (i.e., operation zones in the table 3 defined by the ranges (4) and (6), (4) and (7), and (4) and (8)), the vehicle operator is allowed to further depress the brake pedal 1. With the above brake pedal operations, the directional control valves 4A and 4B are turned on and off repeatedly to realize the ABS control for applying optimum brake forces to the wheels.

Figure 10:
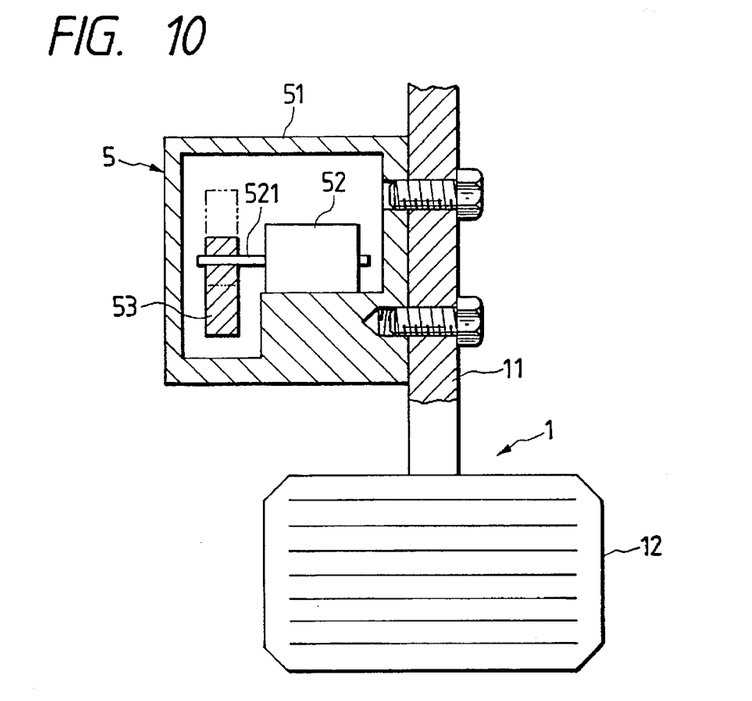
FIG. 10 is a partial cross-sectional view which shows a structure of a modification of the excessive brake actuating force alarm show in FIG. 2.

FIG. 10 shows a modification of the excessive brake actuating force alarm 5, as explained above with reference to FIG. 2.

The motor 52 has the output shaft 521 extending perpendicular to the operating arm 11 of the brake pedal 1 so that a surface of the eccentric disc 53 may be arranged in parallel to the operating arm 11. Likewise to the one shown in FIG. 2, upon rotation of the eccentric disc 53, vibrations are produced in a direction perpendicular to the drawing, and then transmitted to the vehicle operator through the brake pedal 1.

Figure 11:
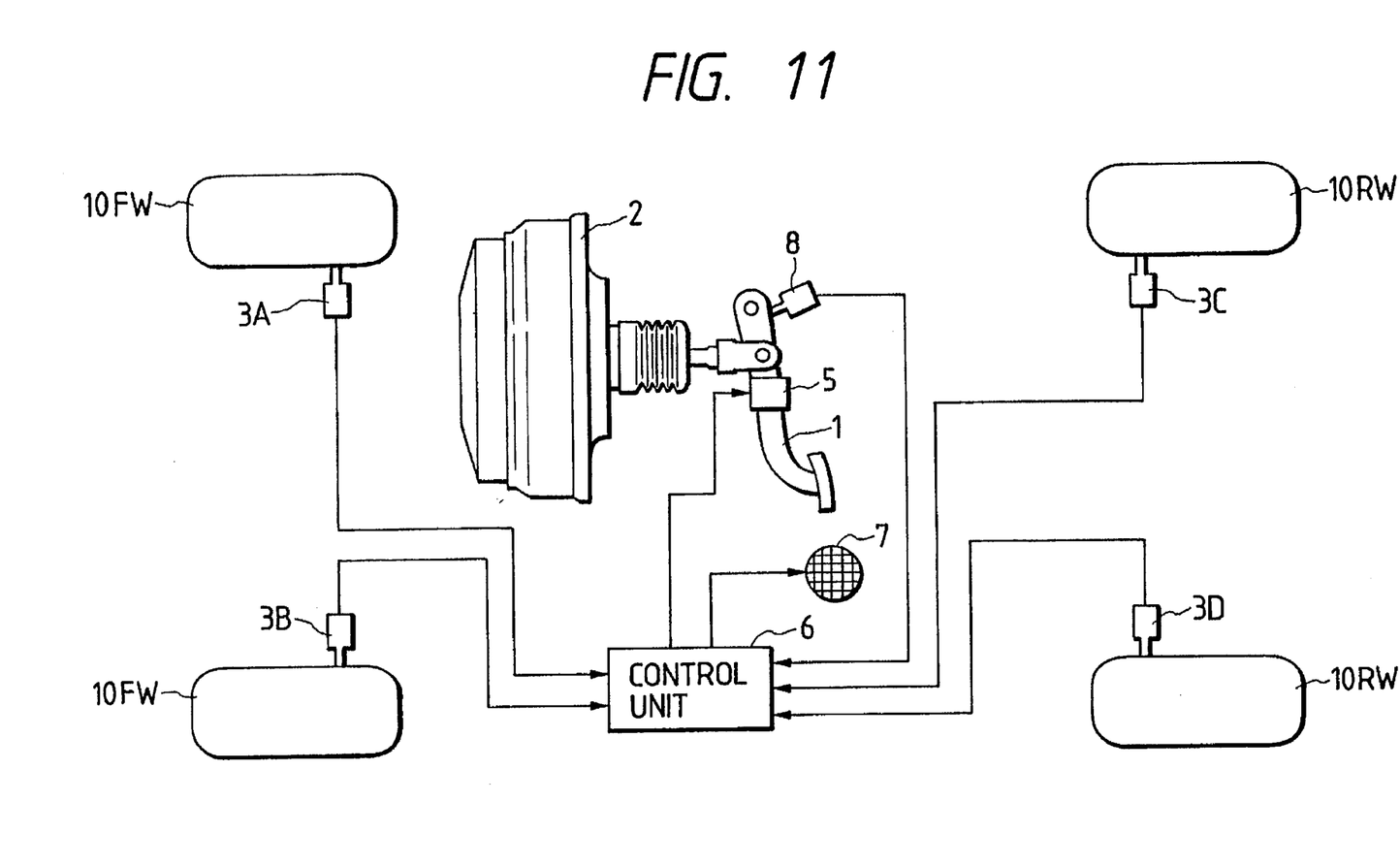
FIG. 11 is a block diagram which shows a brake control system according to the second embodiment of the invention.

FIG. 11 shows a brake control system of the second embodiment wherein the present invention is used with a conventional brake unit without the ABS.

As clearly shown in the drawing, the brake control system of this embodiment does not have the directional control valves 4A and 4B shown in FIG. 1. Other arrangements are substantially identical with those of the first embodiment, and explanation thereof in detail will be omitted here.

Figure 12:
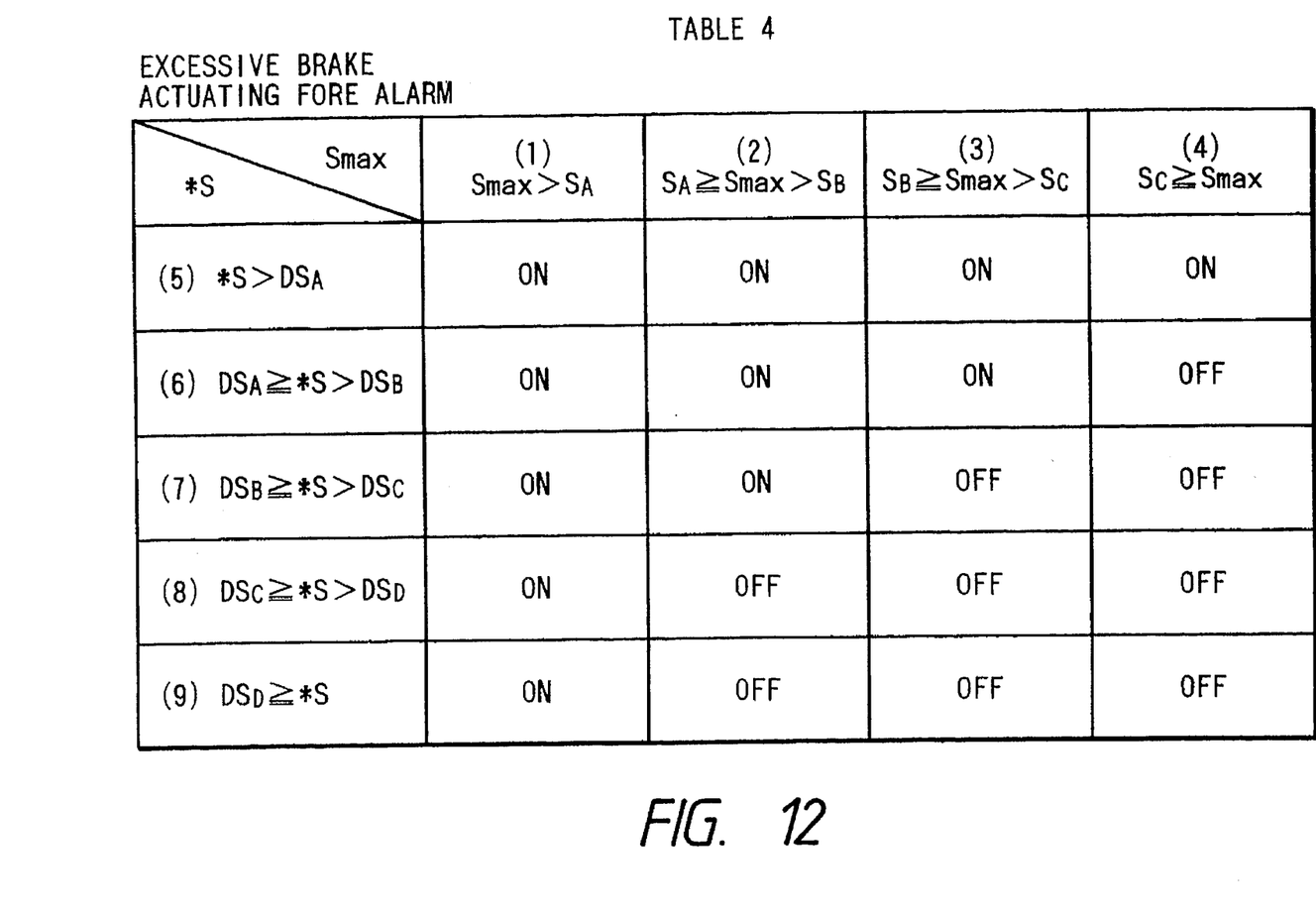
FIG. 12 is a table 4 which shows an on-off operation pattern for an excessive brake actuating force alarm of the second embodiment.
Figure 13:
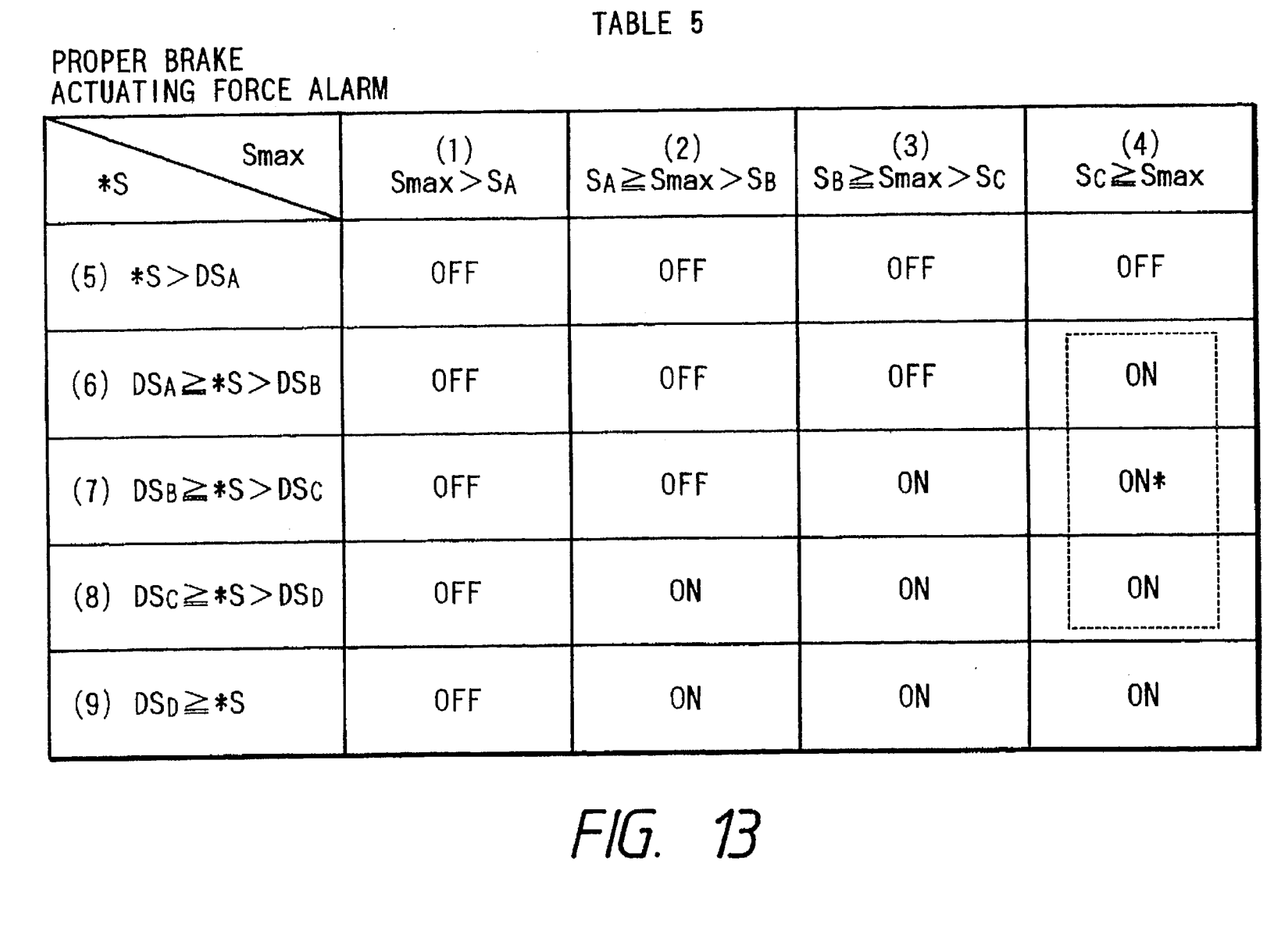
FIG. 13 is a table 5 which shows an on-off operation pattern for a proper brake actuating force alarm of the second embodiment.

The excessive brake actuating alarm 5 and the proper brake actuating force alarm 7 may also be controlled according to the flowcharts, as shown in FIGS. 3 and 8, in the first embodiment, but are turned on and off, in step 107, according to tables 4 and 5 shown in FIGS. 12 and 13.

The table 4 shows an operation schedule for the excessive brake actuating force alarm 5, while the table 5 shows an operation schedule for the proper brake actuating force alarm 7. The table 4 is different from the table 2 in FIG. 5 only in that the excessive brake actuating force alarm 5 is turned on when the maximum slip ratio Smax falls within the range (4) and the slip ratio variation *S falls within the range (5), that is, when the wheels are hardly skidding, but are being quickly brought into locked conditions. The table 5 is different from the table 3 in FIG. 6 only in that the proper braking actuating force alarm 7 is turned off when the maximum slip ratio Smax falls within the range (4) and the slip ratio variation *S falls within the range (5). This is because when the maximum slip ratio Smax and the slip ratio variation *S fall within the ranges (4) and (5), respectively, the brake control system of the first embodiment turns on both the directional control valve 4A and 4B to release the brake assist mode of the booster 2 for decreasing the brake actuating force, however, the second embodiment does not have the directional control valves 4A and 4B, so that a brake assisting force provided by the booster 2 cannot be controlled. Therefore, when the wheels are hardly skidding, but are being quickly brought into locked conditions, the excessive brake actuating force alarm 5 is turned on to produce vibrations instructing the vehicle operator to return the brake pedal 1 slightly. Other operations are the same as those of the first embodiment, and explanation thereof in detail will be omitted here.

While in the above embodiment, the four wheel speed sensors 3A to 3D are provided one for each wheel, a speed sensor installed as a speedometer may be used in place of the wheel speed sensors 3C and 3D for the rear wheels in the case of a FR (Front Engine Rear Drive) vehicle. The reason for this is that speeds of rear wheels may usually be considered to be substantially equal to a vehicle body speed since the rear wheels are commonly smaller in braking force distribution than front wheels so that slip ratios of the rear wheels are smaller than those of the front wheels.

In the case of a FF vehicle, installed speed sensors may be used as the wheel speed sensors 3A and 3B for the front wheels. Additionally, a wheel speed sensor may be provided only for either of the rear left and right wheels. This is because the rear wheels are, as already mentioned, smaller in braking force than the front wheels so that wheel speeds of the right and left rear wheels are substantially equal to each other.

While the present invention has been disclosed in terms of the preferred embodiment in order to facilitate a better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

For example, the excessive brake actuating force alarm 5 and the proper brake actuating force alarm 7 may be formed with various types of alarms such as buzzers producing different tone colors and head-up display units.

In the case of a vehicle having more than four wheels, the same ABS control as in the above embodiment may be performed by providing at least one wheel speed sensor for each axle.

The booster 2 is not limited to the above discussed vacuum type, but can be of a braking-assist switchable structure such as a booster using atmospheric pressure and positive pressure or a hydraulic booster.

The brake control system of the invention may be used with a two-wheeled vehicle such as a motorbike. Usually, motorbikes may be classified into two types: one using a brake lever for a front wheel and a brake pedal for a rear wheel, and the second using brake levers for both wheels. Thus, for example, a vehicle driver may be informed of a braking condition only of a front wheel. The braking control operations may be performed according to the flowchart shown in FIG. 3 using a front and rear wheel speed sensor, however, it is advisable that steps following step 102 be performed according to two flows for the front and rear wheels, and step 107 be performed only using the map shown in the table 4.

What is claimed is:

1. A brake control system for an automotive vehicle comprising:

a brake unit operable in first and second brake control modes, in the first brake control mode a first braking force corresponding to a brake pedal-depressed force exerted by a vehicle operator on a brake pedal is applied to a vehicle wheel, in the second brake control mode a second braking force corresponding to an amplified brake pedal-depressed force exerted by the driver on the brake pedal is applied to the vehicle wheel;

slippage condition determining means for determining a slippage condition of the wheel;

control means for controlling the brake unit in one of the first and the second brake control modes selected based on the slippage condition determined by said slippage condition determining means; and slippage condition informing means for informing the vehicle operator that the wheel is in one of a locked condition and a condition wherein the wheel is being brought into a locked condition responsive to the slippage condition determined by said slippage condition determining means indicating that the wheel is in one of said locked condition and said condition wherein the wheel is being brought into the locked condition, wherein the slippage condition determining means determines a slip ratio of the wheel and a slip ratio variation per unit time, and wherein the slippage condition informing means provides a warning signal to the vehicle operator responsive to a combination of the slip ratio and the slip ratio variation falling within a given range, and wherein the slippage condition informing means provides a signal to the vehicle operator responsive to one of first, second and third conditions being encountered, wherein in the first condition the slip ratio is greater than a first slip ratio threshold value, in the second condition the slip ratio is smaller than the first slip ratio threshold value and greater than a second slip ratio threshold value and the slip ratio variation is greater than a first slip ratio variation threshold value indicating that the wheel is being brought into said locked condition, and in the third condition the slip ratio is smaller than the second slip ratio threshold value and greater than a third slip ratio threshold value and the slip ratio variation is greater than a second slip ratio variation threshold value greater than the first slip ratio variation threshold value.

2. A brake control system as set forth in claim 1, further comprising proper brake pedal-depressed force informing means informing the vehicle operator that a maximum deceleration braking force which provides a maximum deceleration to the wheel without locking the wheel or bringing the wheel into the locked condition, is acting on the brake pedal responsive to the brake pedal-depressed force exerted on the brake pedal falling within a given brake pedal-depressed force range.

3. A brake control system as set forth in claim 2, wherein the proper brake pedal-depressed force informing means provides a proper braking condition indicative signal to the vehicle operator responsive to the brake pedal-depressed force falling within the given brake pedal-depressed force range, the proper braking condition indicative signal indicating that the maximum deceleration braking force is acting on the brake pedal.

4. A brake control system as set forth in claim 1, further comprising proper brake pedal-depressed force informing means informing the vehicle operator that a maximum deceleration braking force which provides a maximum deceleration to the wheel without locking the wheel or bringing the wheel into the locked condition, is acting on the brake pedal responsive to the brake pedal-depressed force exerted on the brake pedal falling within a given brake pedal-depressed force range.

5. A brake control system as set forth in claim 4, wherein the brake pedal-depressed force informing means provides a proper braking condition indicative signal to the vehicle operator responsive to one of fourth, fifth and sixth conditions being encountered, wherein in the fourth condition the slip ratio is smaller than the third slip ratio threshold value, in the fifth condition the slip ratio is greater than the third slip ratio threshold and smaller than the second slip ratio threshold value and the slip ratio variation is smaller than the first slip ratio variation threshold value, and in the sixth condition the slip ratio is greater than the second slip ratio threshold value and smaller than the first slip ratio threshold value and the slip ratio variation is smaller than the first slip ratio variation threshold value.

6. A brake control system as set forth in claim 5, wherein the proper brake pedal-depressed force informing means provides the proper braking condition indicative signal only for a preselected period of time after a given condition that the slip ratio is smaller than the third slip ratio threshold value and the slip ratio variation is greater than the third slip ratio variation threshold value and smaller than a fourth slip ratio variation threshold value greater than the second slip ratio variation value, is met.

7. A brake control system as set forth in claim 1, wherein the slippage condition informing means provides vibrations to the vehicle operator through the brake pedal as the warning signal.

8. A brake control system as set forth in claim 7, wherein the slippage condition informing means includes a vibration producing assembly attached to the brake pedal, including a motor and an eccentric disc rotated by the motor so as to produce the vibrations.

9. A brake control system as set forth in claim 8, wherein the vibration producing means assembly produces the vibrations in a direction of pivotal movement of the brake pedal.

10. A brake control system for an automotive vehicle comprising:

a brake unit operable in first and second brake control modes, in the first brake control mode a first braking force corresponding to a brake pedal-depressed force exerted by a vehicle operator on a brake pedal is applied to a vehicle wheel, in the second brake control mode a second braking force corresponding to an amplified brake pedal-depressed force exerted by the driver on the brake pedal is applied to the vehicle wheel;

slippage condition determining means for determining a slippage condition of the wheel;

control means for controlling the brake unit in one of the first and the second brake control modes selected based on the slippage condition determined by said slippage condition determining means; and slippage condition informing means for informing the vehicle operator that the wheel is in one of a locked condition and a condition wherein the wheel is being brought into a locked condition responsive to the slippage condition determined by said slippage condition determining means indicating that the wheel is in one of said locked condition and said condition wherein the wheel is being brought into the locked condition, wherein the slippage condition determining means determines a slip ratio of the wheel and a slip ratio variation per unit time, and wherein the slippage condition informing means provides a warning signal to the vehicle operator responsive to a combination of the slip ratio and the slip ratio variation falling within a given range, wherein the given range is indicative of excess of the brake pedal depressed force, and wherein the slippage condition informing means provides vibrations to the vehicle operator through the brake pedal as the warning signal.

11. A brake control system for an automotive vehicle comprising:

a brake unit responsive to a brake pedal-depressed force exerted by a vehicle operator on a brake pedal for applying a brake to a wheel;

slippage condition determining means for determining a slippage condition of the wheel; and slippage condition informing means for informing the vehicle operator that the wheel is in one of a locked condition and a condition wherein the wheel is being brought into a locked condition responsive to the slippage condition determined by said slippage condition determining means indicating that the wheel is in one of said locked condition and said condition wherein the wheel is being brought into the locked condition, wherein the slippage condition determining means determines a slip ratio of the wheel and a slip ratio variation per unit time, and wherein said slippage condition informing means provides a warning signal to the vehicle operator responsive to a combination of the slip ratio and the slip ratio variation falling within a given range, wherein the given range is a range indicative of excess of the brake pedal depressed force, and wherein the slippage condition informing means provides vibrations to the vehicle operator through the brake pedal as the warning signal.

12. A brake control system for an automotive vehicle comprising:

a brake unit responsive to a brake pedal-depressed force exerted by a vehicle operator on a brake pedal for applying a brake to a wheel;

slippage condition determining means for determining a slippage condition of the wheel; and slippage condition informing means for informing the vehicle operator that the wheel is in one of a locked condition and a condition wherein the wheel is being brought into a locked condition responsive to the slippage condition determined by said slippage condition determining means indicating that the wheel is in one of said locked condition and said condition wherein the wheel is being brought into the locked condition, wherein the slippage condition determining means determines a slip ratio of the wheel and a slip ratio variation per unit time, and wherein said slippage condition informing means provides a warning signal to the vehicle operator responsive to a combination of the slip ratio and the slip ratio variation falling within a given range, wherein the slippage condition informing means provides a signal to the vehicle operator responsive to one of first, second and third conditions being encountered, wherein in the first condition the slip ratio is greater than a first slip ratio threshold value, in the second condition the slip ratio is smaller than the first slip ratio threshold and greater than a second slip ratio threshold value and the slip ratio variation is greater than a first slip ratio variation threshold value indicating that the wheel is being brought into said locked condition, and in the third condition the slip ratio is smaller than the second slip ratio threshold value and greater than a third slip ratio threshold value and the slip ratio variation is greater than a second slip ratio variation threshold value greater than the first slip ratio variation threshold value.

13. A brake control system as set forth in claim 12, further comprising proper brake pedal-depressed force informing means informing the vehicle operator that a maximum deceleration braking force which provides a maximum deceleration to the wheel without locking the wheel or bringing the wheel into the locked condition, is acting on the brake pedal responsive to the brake pedal-depressed force exerted on the brake pedal falling within a given brake pedal-depressed force range.

14. A brake control system as set forth in claim 13, wherein said proper brake pedal-depressed force informing means provides a proper braking condition indicative signal to the vehicle operator responsive to the brake pedal-depressed force falling within the given brake pedal-depressed force range, the proper braking condition indicative signal indicating that the maximum deceleration braking force is acting on the brake pedal.

15. A brake control system as set forth in claim 12, further comprising proper brake pedal-depressed force informing means informing the vehicle operator that a maximum deceleration braking force which provides a maximum deceleration to the wheel without locking the wheel or bringing the wheel into the locked condition, is acting on the brake pedal responsive to the brake pedal-depressed force exerted on the brake pedal falling within a given brake pedal-depressed force range.

16. A brake control system as set forth in claim 15, wherein the brake pedal-depressed force informing means provides a proper braking condition indicative signal to the vehicle operator responsive to one of fourth, fifth and sixth conditions being encountered, wherein in the fourth condition the slip ratio is smaller than the third slip ratio threshold value and the slip ratio variation is smaller than a third slip ratio variation threshold value greater than the second slip ratio variation threshold value, in the fifth condition the slip ratio is greater than the third slip ratio threshold and smaller than the second slip ratio threshold value, and in the sixth condition the slip ratio is greater than the second slip ratio threshold value and smaller than the first slip ratio threshold value and the slip ratio variation is smaller than the first slip ratio variation threshold value.

17. A brake control system as set forth in claim 16, wherein the proper brake pedal-depressed force informing means provides the proper braking condition indicative signal only for a preselected period of time after a given condition that the slip ratio is smaller than the third slip ratio threshold value and the slip ratio variation is greater than a fourth slip ratio variation threshold value smaller than the first slip ratio variation threshold value and smaller than the third slip ratio variation threshold value, is met.

18. A brake control system as set forth in claim 12, wherein the slippage condition informing means also provides the warning signal to the vehicle operator responsive to a fourth condition being encountered that the slip ratio is smaller than the third slip ratio threshold value and the slip ratio variation is greater than a third ship ratio variation threshold value greater than the second slip ratio variation threshold value.

19. A brake control system as set forth in claim 12, wherein the slippage condition informing means provides vibrations to the vehicle operator through the brake pedal as the warning signal.

20. A brake control system as set forth in claim 19, wherein the slippage condition informing means includes a vibration producing assembly attached to the brake pedal, including a motor and an eccentric disc rotated by the motor so as to produce the vibrations.

21. A brake control system as set forth in claim 20, wherein the vibration producing means assembly produces the vibrations in a direction of pivotal movement of the brake pedal.

* * * * *